United States Patent [19]

Baker et al.

[11] Patent Number: 4,726,725

[45] Date of Patent: Feb. 23, 1988

[54] LOAD GRASPING APPARATUS FOR NARROW AISLE STACKER CRANE

[75] Inventors: Dale A. Baker, Waukesha; William H. Smith, Greendale, both of Wis.

[73] Assignee: Harnischfeger Corporation, Brookfield, Wis.

[21] Appl. No.: 872,661

[22] Filed: Jun. 10, 1986

[51] Int. Cl.⁴ .............................................. B65G 1/20
[52] U.S. Cl. ................................... 414/283; 414/910
[58] Field of Search .............. 414/282, 277, 280, 283, 414/787, 908, 910

[56] References Cited

U.S. PATENT DOCUMENTS

| | | | |
|---|---|---|---|
| 3,877,595 | 4/1975 | Edelman | 414/910 X |
| 4,079,904 | 3/1978 | Groskopfs et al. | 414/283 X |
| 4,090,624 | 5/1978 | Krein et al. | 414/908 X |
| 4,364,706 | 12/1982 | Kranslmüller | 414/283 X |
| 4,375,936 | 3/1983 | Dechantreiter | 414/910 X |
| 4,549,841 | 10/1985 | Ishige | 414/282 |
| 4,595,332 | 6/1986 | Loomer | 414/282 X |

FOREIGN PATENT DOCUMENTS 151534 9/1982 Japan .................... 414/277

*Primary Examiner*—Peter A. Aschenbrenner
*Attorney, Agent, or Firm*—James E. Nilles; Nicholas A. Kees

[57] ABSTRACT

A warehouse stacker crane for inserting and removing a load in a storage station of a storage rack including a chassis movable horizontally along an aisle adjacent the storage rack, a carriage on the chassis which is movable vertically to a position aligned with the storage station, and load-grasping apparatus on the carriage for releasably grasping the load and for inserting and removing it from the storage station. The load grasping apparatus comprises a horizontally disposed rotatable splined shaft on which a pair of arms is mounted. The arms have load-engaging devices at their distal ends. The arms are swingable in horizontally spaced apart parallel vertical planes 15 as the shaft is selectively rotated. The arms are also slidably movable axially on the shaft toward and away from each other to grasp and release the load by a selectively operable actuator connected therebetween. Prior to load insertion and removal the arms are drawn toward each other to engage the load. During load 20 insertion and removal the carriage is moved vertically simultaneously with the arms (with load attached) being pivoted. As a result, the load moves only horizontally relative to the storage station. After load insertion, the carriage is lowered slightly to place the load in an at-rest position in the storage station. Prior to load removal, the carriage is raised slightly to raise the load from the at-rest position. A control system operates the stacker crane and the load-grasping apparatus.

17 Claims, 15 Drawing Figures

LOAD GRASPING APPARATUS FOR NARROW AISLE STACKER CRANE

BACKGROUND OF THE INVENTION

This invention relates to materials-handling devices normally referred to as stacker cranes, and in particular to stacker cranes having load grasping apparatus capable of transporting a load and storing it in a rack, such as in a warehouse, the rack having a number of storage stations along a narrow aisle.

Previous stacker cranes have generally had limitations in their use of space, especially space in the vertical dimension which is particularly expensive, and also in the dimension perpendicular to the aisles, which is also quite expensive. For instance, patents like Dechantsreiter, U.S. Pat. No. 4,375,936, and Luebke, U.S. Pat. No. 4,538,954, both have fixed and rigid fork-like members which are inserted under the load in its storage position. The cranes disclosed in these patents require that enough room exist between the racks, that is, that the aisles be wide enough, to accommodate the length of the fork-like members in addition to the mast or vertical support structure of the crane. Hence the aisle may have to be substantially wider than the either the mast alone or the load alone.

One solution to this problem has been to split the mast or vertical support vertically into two parts in order to allow the fork-like members to slide between them, effectively allowing the aisles to be narrower, the minimum then being the length of the fork-like members. This solution is disclosed in Reiff, U.S. Pat. No. 4,523,887. This is not a complete solution, however, since the fork-like members must be long enough to safely reach under even the largest load likely to be stored in the rack, with some additional length required for safety. Once again, then, the length of the fork-like members may require the aisle to be wider than the load alone. This basic space inefficiency is inherent in this type of crane.

One solution to this basic space inefficiency is to provide a telescoping shuttle-type crane 1 as shown in FIGS. 1 and 2. The crane 1 shown in those figures includes a vertical mast 2. A crane carriage 3 is raised and lowered along the mast 2 to vertically position a load 4, which rests on a telescoping shuttle table 5. In turn shuttle table 5 rests on the carriage 3. In the apparatus shown, shuttle table 5 has three segments. FIG. 1 shows the shuttle table 5 in the travel position, while FIG. 2 shows the shuttle table 5 in its storage position. As can be seen by comparing these two figures, the load is moved transversely by transverse motion of the segments of the table 5. Higher segments must move further than the lower segments. The disadvantage of this apparatus is that, as the weight of the load 4 is increased, or as the required distance of the transverse motion is increased, the segments of the table 5 and the carriage 3 must be strengthened or the number of segments increased or both. This results in a required increase in the size of the "shuttle window," which is defined as the vertical distance the load 4 is required to be lifted in order to clear any load support means in the rack plus the the vertical distance required to exist between successive loads in order to allow all segments of the shuttle table 5 to be inserted therebetween. Other shuttle mechanisms having similar elements are disclosed in Dechantsreiter et al, U.S. Pat. No. 3,830,379, Klebe, U.S. Pat. No. 4,331,418 and Burt, U.S. Pat. No. 4,428,708.

However, none of the above patents disclose a solution to this last disadvantage, that is, as the size and weight of the load are increased, the load carrying members must be strengthened or reinforced in order to support the additional load. This results in the requirement of a larger shuttle window. For example, for a shuttle crane designed to carry loads up to 40 tons, the shuttle window may have to be increased by up to 30 inches or more solely to accommodate the shuttle table, resulting in a total waste of up to ten to twelve feet or more of the vertical dimension, considering the fact that the height of a rack for stacking loads five high is increased by five times the increase in the shuttle window size. To put it another way, if the shuttle window of each of five vertically arranged storage stations can be reduced by up to 30 inches, there is the possibility that sufficient vertical distance would be cleared for a sixth storage station where there had formerly been only five.

In addition, it may be desirable to have the capability to store the load on support means located at floor level, rather than beginning 30 inches above floor level.

This invention relates to improvements to the apparatus described above and to solutions to the problems raised thereby.

SUMMARY OF THE INVENTION

The invention is a warehouse crane which includes a means for grasping a load which may be palletized or containerized and stacking the load in or unstacking the load from a storage station in a rack, such as in an automated warehouse. The grasping means is mounted to a carriage which moves vertically and horizontally to align the grasping means with a storage station as needed. The grasping means includes a pair of opposed arms attached to the carriage and rotatable or swingable in parallel vertical planes. The arms are equipped with gripping means for gripping the load. The general operation of the crane can be described as follows. The carriage is positioned opposite a particular storage station wherein the object load is stored. Next, through a combination of coordinated vertical and rotational movement, the arms are swung outward from a vertical position, whether pointing upward or downward, to a horizontal position, one on each side of the load. The gripping means then engage the load and lift it off its saddle or support in the rack vertically so as to clear. Then, in a coordinated motion, the arms are rotated toward a vertical position by the rotating means while the carriage moves vertically so that the motion of the load is only horizontal at least until it is clear of the rack. When the arms reach the vertical attitude, the load is completely clear of the rack and the crane is ready to move the load along the aisle towards a delivery point. The procedure for storing a load in one of the racks is simply the reverse of the above.

It is thus an object of the invention to provide a stacker crane having means to grasp a load by use of rotating arms connected to a carriage, such that the load is removed from a storage station by coordinated rotational motion of the arms and vertical motion of the carriage.

A more specific object of the invention is to provide a stacker crane as described above having a vertical support which moves horizontally along an aisle of a warehouse, a carriage which moves vertically along the vertical support to align itself with one of several storage stations of the warehouse, and a pair of arms rotatably and opposingly attached to the carriage, the apparatus being controlled so as to grasp a load from the sides and remove it from the storage station or place it in the storage station by coordinated motion of the arms and carriage so that the motion of the load during insertion and removal is only horizontal.

Another specific object of the invention is to provide a stacker crane as described above which does not require an increase in the size of the shuttle window commensurate with an increase in the weight of the load to be transported or an increase in the transverse distance over which the load is to be moved.

Other objects and advantages of the invention will become apparent hereinafter.

DESCRIPTION OF A PREFERRED EMBODIMENT

Figure 5:
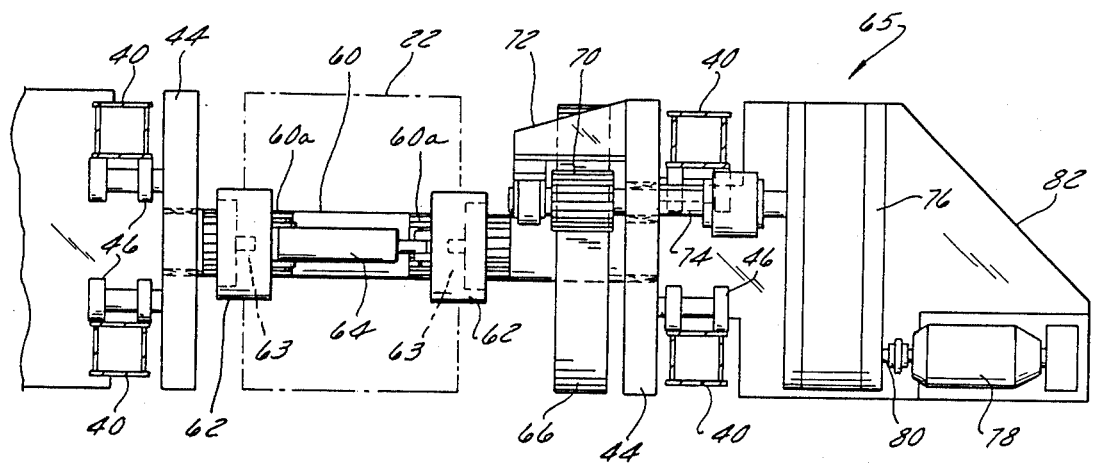
FIG. 5 is a sectional view, taken generally along line 5—5 of FIG. 4, on an enlarged scale, of the carriage portion of the crane as shown in FIG. 4.

The present invention includes a warehouse stacker crane 10 (FIG. 3) having a carriage 26 which is movable vertically and horizontally in a vertical plane so as to align it with a storage station 20. The invention also includes grasping means 28 on the carriage 26 for grasping a load 22 for inserting it in or removing it from storage station 20. The insertion and removal is accomplished by rotating the grasping means 28 in a perpendicular vertical plane with respect to the carriage 26 and coordinatedly moving the carriage 26 vertically, so that the load 22 moves only horizontally. The means for aligning the carriage 26 with the storage station 20 may be any suitable stacker crane mast and power means.

The horizontal motion of the carriage 26 takes place along an aisle 16, that is, a lengthwise space between two storage racks 18 of the warehouse. Each of the racks 18 has a plurality of storage stations 20 located therein. Each of the storage stations 20 has a means secured therein for holding a load to be stored in the particular station. In the embodiment shown in the drawing figures the load is a coil 22 of steel formed in a generally cylindrical shape. The holding means is then shown to be saddle means 24 attached to the bottom of each storage station 20 and having cylindrically concave upper surfaces for supporting the ends of the coils 22. However, since the load may take many forms, any suitable means for holding the load intended to be stored in the racks 18 may be employed.

Horizontal Carriage Movement

Figure 3:
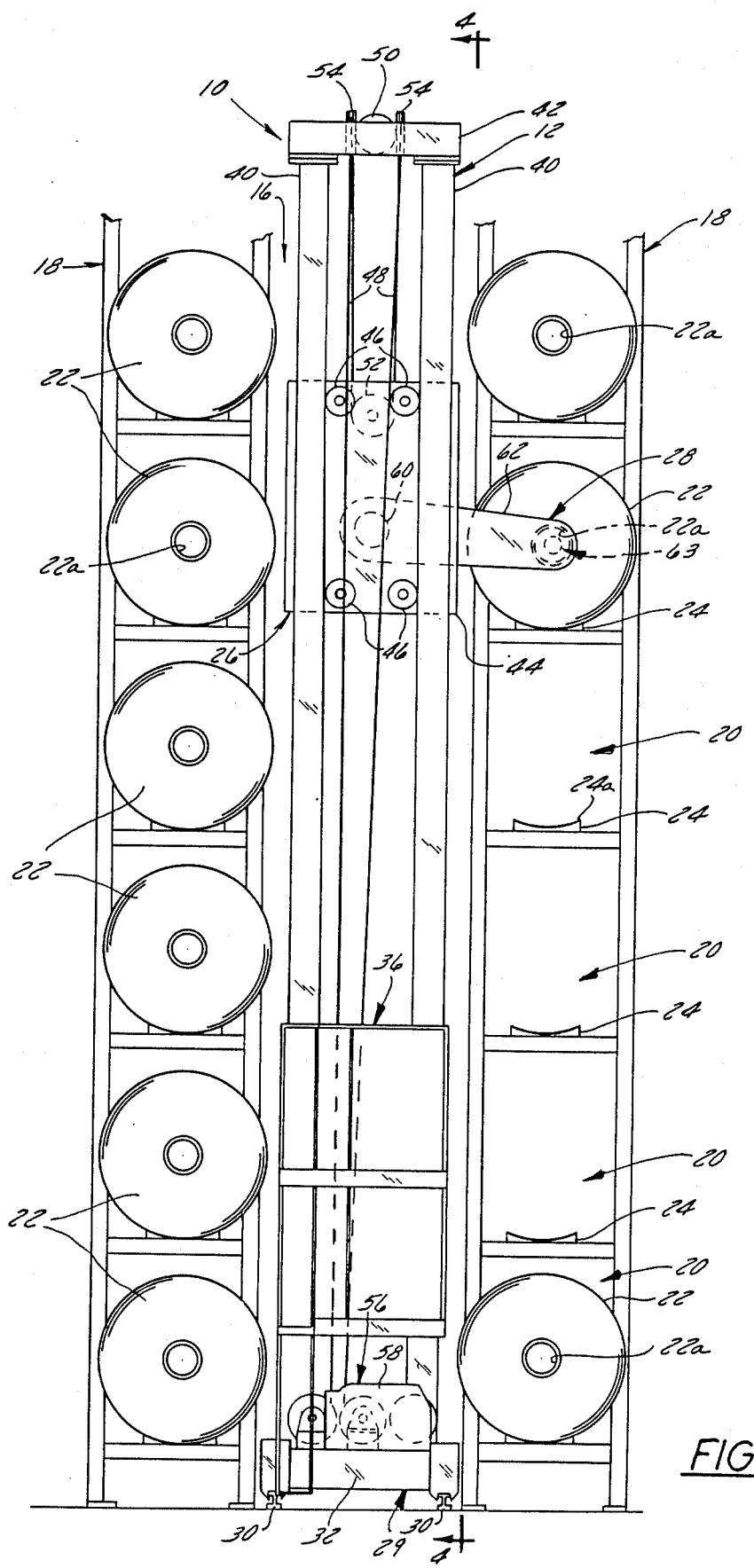
FIG. 3 is a side elevational view of a warehouse stacker crane constructed according to one embodiment of the invention, showing the carriage in a raised position with the arms in the storage position.
Figure 4:
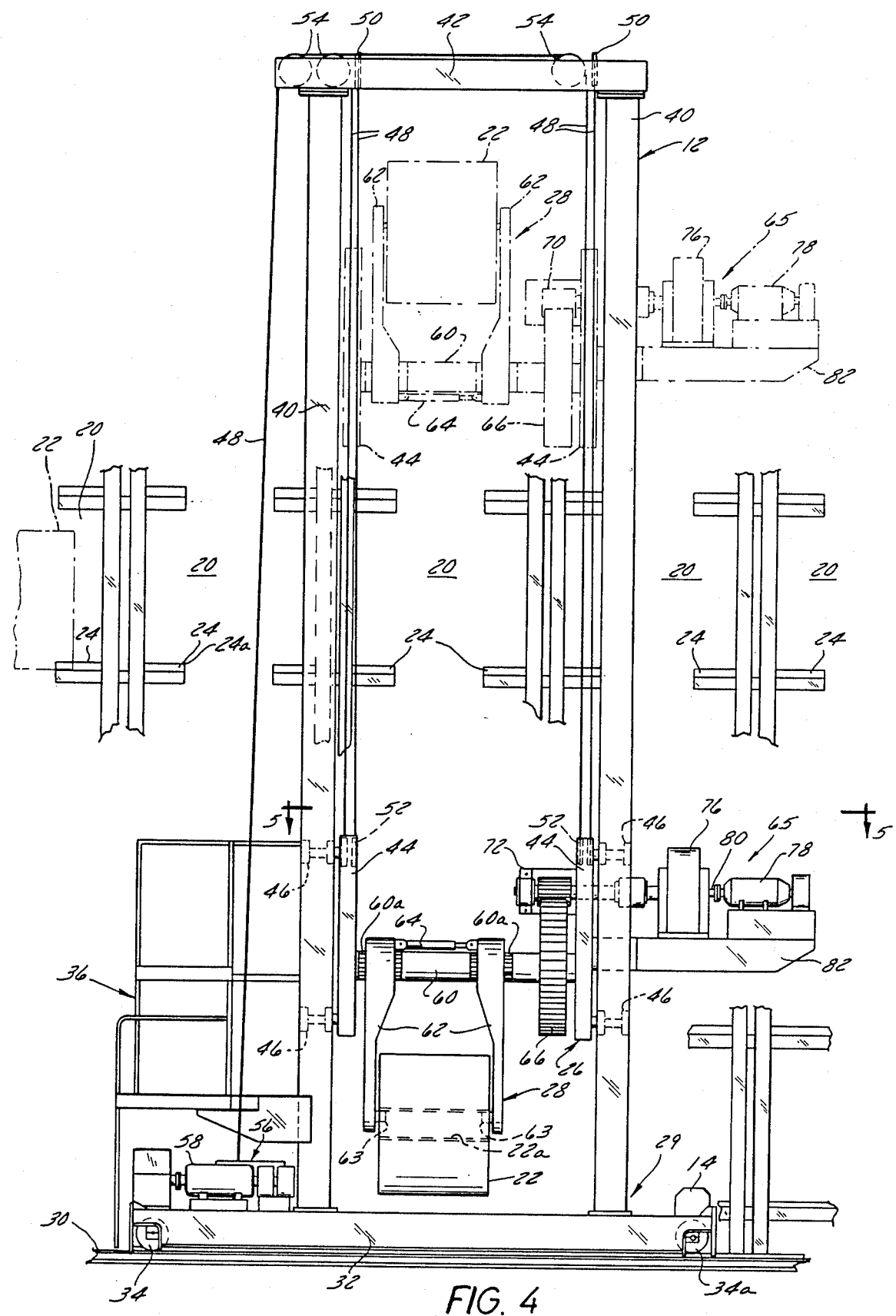
FIG. 4 is a sectional view of the crane shown in FIG. 3, taken generally along line 4—4, and showing the carriage in a lowered position and the arms in a "load-down" position. The carriage is also shown in phantom in a raised position with the arms in a "load-up" position.
Figure 7:
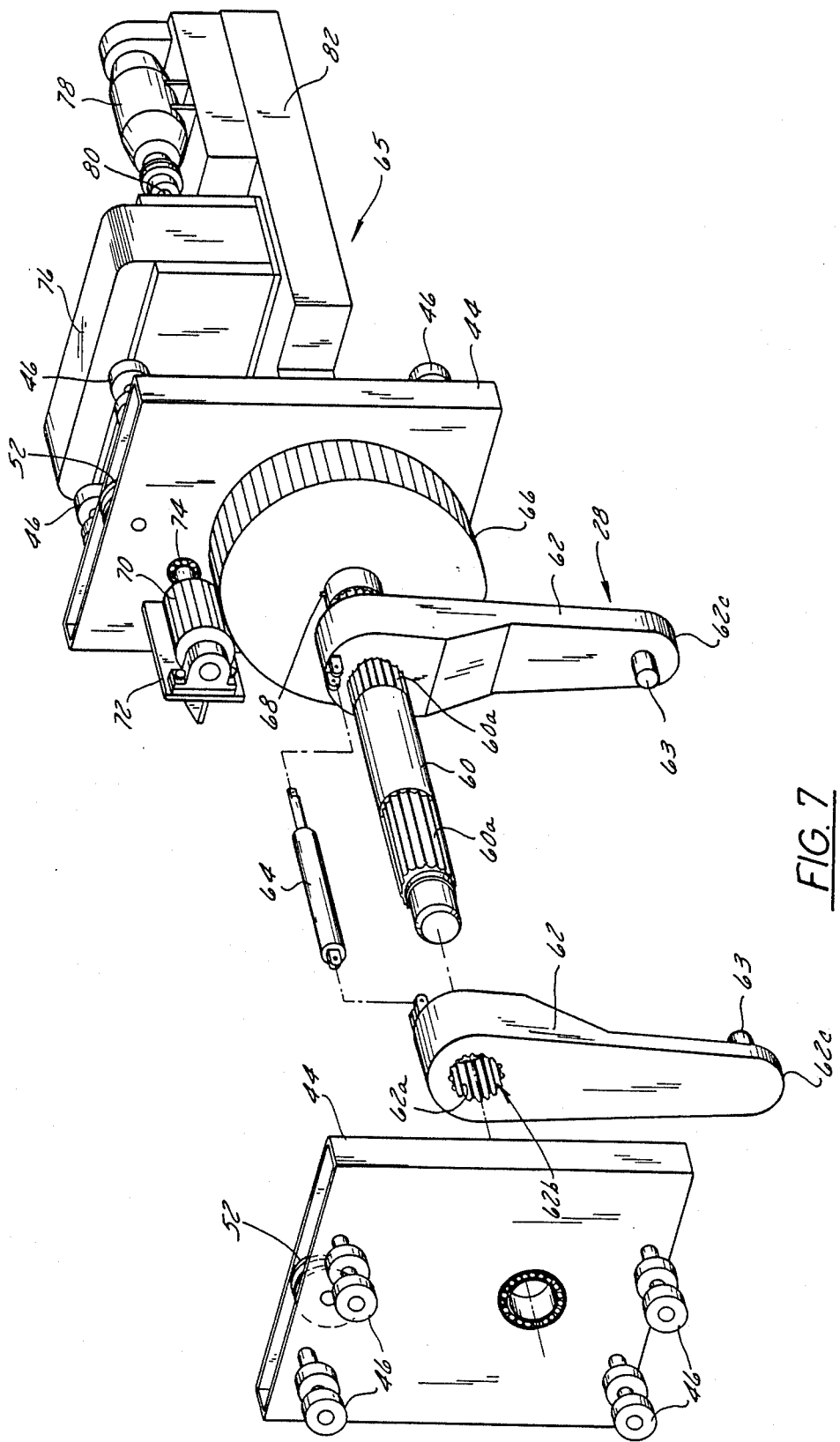
FIG. 7 is an exploded isometric view of the carriage portion of the crane, on an enlarged scale.

As referred to above, means are provided for moving the carriage 26 horizontally along the aisle 16. Referring to FIGS. 3 and 4, the crane 10 rests on a support system comprising horizontally oriented straight rails 30 arranged parallel to and substantially centrally located in the aisle 16, preferably on the floor thereof. A lower truck 29 includes a frame 32 and is arranged lengthwise parallel to the rails 30. The lower truck 29 further includes a plurality of wheels 34, located at least at each corner thereof and journaled to the frame 32. These wheels in turn ride on rails 30. At least one of these wheels 34a is driven by an aisle drive power means 14 including a motor or other prime mover connected to wheels 34a.

Aisle drive power means 14 is controlled by conventional crane motor control means 36 such as those disclosed in Dechantsreiter et al, U.S. Pat. No. 3,830,379. A vertical support 12 is attached vertically to and rests on the lower truck 29, and is thus moved horizontally along with the lower truck 29 by the aisle drive power means 14.

Vertical Carriage Movement

As also referred to above, means are provided for moving the carriage 26 vertically along vertical support 12. The vertical support 12 is attached at its bottom to the top of frame 32, so that it moves horizontally with the lower truck 29. The vertical support 12 preferably includes four vertically arranged masts 40 attached at their bottom to the lower truck 29 and connected together at their top by a sheave frame 42. Referring now to FIGS. 3 through 7, the carriage 26 includes two planar side plates 44, arranged vertically, spaced horizontally apart and approximately parallel to each other, each having a pair of equalized rollers 46, in each of the four corners, rotatably attached approximately perpendicular to the side plates 44. These rollers 46 are arranged so as to run along the length of the rails 40, and allow the carriage 26 to move vertically relative to the vertical support 12. A pair of cables 48 are each attached at one of their ends to the sheave frame 42 by any suitable attachment means 50. These cables 48 are routed first downward and reeved about sheaves 52 which are rotatably attached to carriage side plates 44. From there the cables 48 pass upward to be reeved about frame sheaves 54, which are supported by and rotatably attached to the sheave frame 42 at the top of crane 10. More than one set of sheaves 52 and 54 may be provided, about which each cable 48 is reeved, to improve leverage similar to a block-and-tackle arrangement. The opposite ends of the cables 48 are connected to power winch means 56 located on the lower truck 29, which power winch means will generally include a winch motor 58 also controlled by motor control means 36. Vertical movement of the carriage 26 is thus effected by actuation of the winch means 56 and cables 48, via the control means 36 provided remotely, as is well known in the art.

Carriage and Grasping Means

Figure 6:
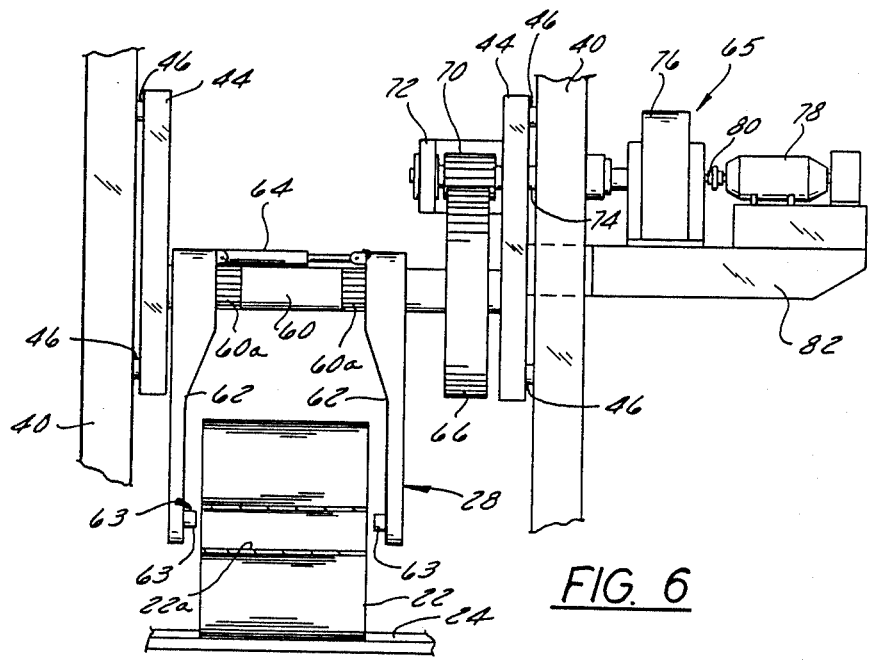
FIG. 6 is a front elevational view of the carriage portion of the crane as shown in FIG. 5, except that here the arms have separated from the load.
Figure 1:
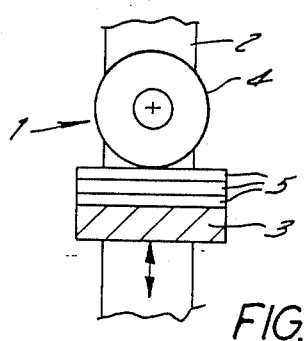
FIG. 1 is a side view, partially schematic, of a prior art telescoping shuttle crane apparatus, having its shuttle table in the travel position.
Figure 2:
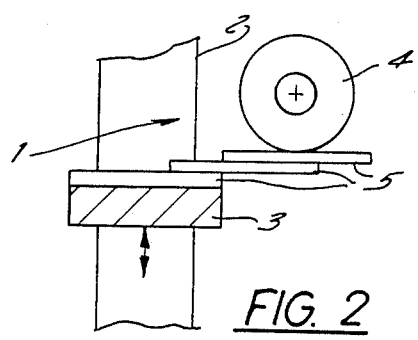
FIG. 2 is a side view of the crane shown in FIG. 1, showing the shuttle table in its storage position.

As stated above, means 28 for grasping the load 22 are provided as shown in FIGS. 3 through 7. Grasping means 28 include a shaft means 60, which in one embodiment is a single unitary shaft, journaled between the carriage side plates 44 running in the same direction as the aisle 16. In the embodiment shown, a pair of opposing arms 62 are mounted to the shaft 60. Each of these arms 62 is mounted so as to be axially slidable along a respective splined portion 60a of shaft 60, the splines of shaft 60 meshing with similar splines 62a inside the aperture 62b of the arms 62 through which the shaft 60 is inserted. Hence the arms 62 are not rotatable with respect to the shaft 60, but rotate with the shaft 60 as it rotates. The arms 62 are spaced apart from each other and mounted on shaft 60 so as to always be parallel and co-extensive with each other. The spacing between the arms 62 is determined and controlled by power cylinder means 64, which may be a hydraulic cylinder or other suitable power means. Thus as shown in FIG. 6 when the cylinder means 64 is extended the arms 62 are at their greatest separation, while retraction of cylinder means 64 causes the arms 62 to move together, as shown in FIG. 4 for instance.

The distal end 62c of each arm 62 is provided with a gripping means 63 (FIG. 7) for gripping the load 22 when the arms 62 are moved together by the power cylinder means 64. In the disclosed embodiment the gripping means 63 include at least one generally cylindrical projection 63a affixed securely to or formed integrally with the distal end 62c of each arm 62. The projection 63a is sized so as to loosely fit into an engaging means 22a at each end of the load 22. The engaging means 22a of the load 22, as shown in FIG. 3, is a generally cylindrical aperture or core which passes entirely through the load 22 along its longitudinal axis. Hence the projection 63a provides a stable surface for supporting the load 22 and avoiding load shifting during the removal and storage operations.

Rotating means 65 are provided for rotating the shaft 60 and in turn the arms 62. In the embodiment shown in FIGS. 4 through 7, rotating means 65 include a drive gear 66, which is mounted to shaft 60 by any suitable non-rotatable means such as key means 68. Thus drive gear 66 rotates with shaft 60 and is not rotatable with respect thereto. Rotating means 65 further includes a pinion gear 70, which is aligned with, meshes with and drives drive gear 66. Pinion gear 70 is generally of smaller diameter than drive gear 66 so that the high speed rotation of a prime mover such as motor 78 is reduced to slow, controllable rotation of the arms 62. Pinion gear 70 is journaled to a bearing bracket 72, which in turn is attached to one of the side plates 44 of the carriage 26 for support. The pinion gear 70 is affixed to a drive shaft 74 which in the embodiment shown extends through the nearer side plate 44 of carriage 26 and connects to a speed reducing means 76. In turn, speed reducing means 76 is driven by a prime mover such as rotator motor 78, by any suitable means such as another shaft 80. Speed reducing means 76 and rotator motor 78 are attached to and supported by a carriage frame portion 82 which is affixed to the nearer carriage side plate 44. Thus the rotating means 65 is a part of and moves vertically with the carriage 26 along its path of motion.

Operation

In operation the present invention will generally be employed in an automated warehouse or similar setting, where the crane 10 will be controlled by control means 36 which may be located remotely from the operating location of the crane itself, although that is not by any means a condition for operation of the crane. Referring to FIG. 3, the load 22 is shown resting on a saddle means 24 in one of a plurality of storage stations 20 in a storage rack 18.

Figure 8:
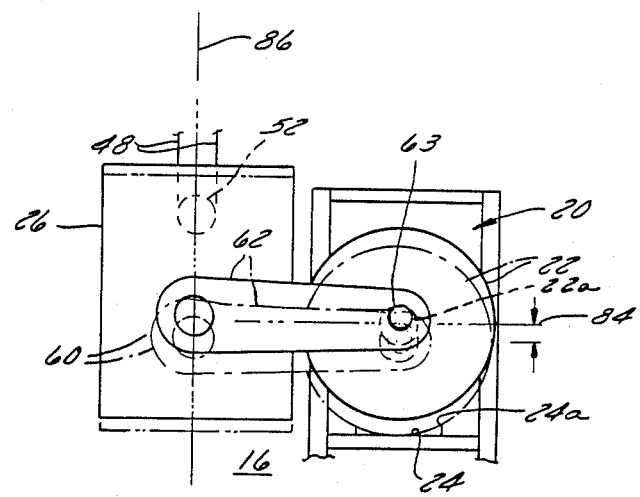
FIGS. 8 through 13 are side elevational views, partially schematic, of the carriage and arms of the crane in working positions as they stack and unstack a load in a storage station of the rack in a coordinated manner.
Figure 9:
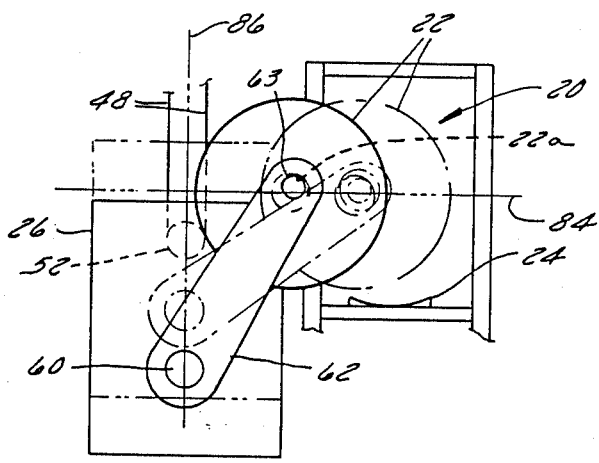
Figure 10:
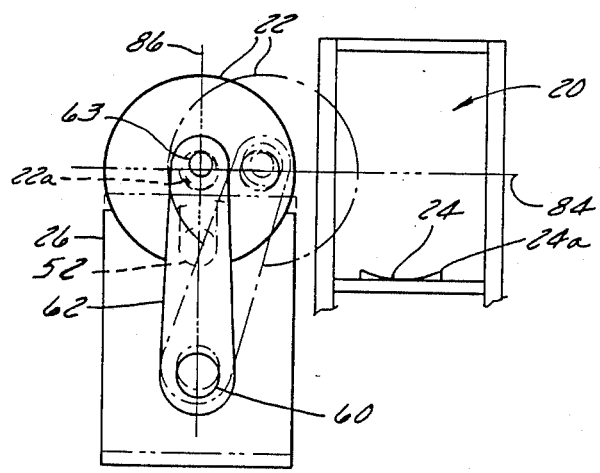

To remove a load 22 from a storage station 20, the procedure is as follows referring to FIGS. 8, 9 and 10. As the carriage 26 is vertically and horizontally aligned with the particular storage station 20 from which the target load 22 is to be removed, the arms 62 are coordinatedly rotated from their travel position wherein they are held vertical inside the carriage 26, to the storage position as shown in phantom in FIG. 8, wherein they are extended horizontally out from the carriage 26. In the storage position the arms 62 straddle the load 22, one arm 62 being on each side thereof, with the gripping means 63 of arms 62 aligned with the engaging means 22a of load 22. The arms 62 are then closed on the load 22 by power cylinder means 64 (FIG. 4), so that the arm gripping means 63 engage the engaging means 22a. The carriage 26 is then raised slightly along track 12. During this slight raising, the arms 62 are prevented from rotating. Alternatively, this slight vertical motion could also be accomplished by simple rotation of the arms 62. In either case, the load 22 is thus raised just enough so that the load 22 clears the highest point 24a of the saddle means 24, as shown in solid lines in FIG. 8. The next step is that the arms 62 are rotated counterclockwise away from the storage station 20 simultaneously with the carriage 26 being moved vertically downward, so that the carriage 26 and arms 62 move through the position shown in 25 phantom in FIG. 9, through the position shown in solid in FIG. 9, and through the position shown in phantom in FIG. 10. Finally the motion is completed when the travel position shown in solid lines in FIG. 10 is reached. Notice that the motion of the load 22 has been essentially entirely horizontal from the point where the load 22 was lifted off the saddle means 24 throughout the removal operation until the load 22 is directly vertically aligned with the carriage 26. The center of the load 22 has followed a straight line path indicated by a generally horizontal line 84, while the carriage 26 has followed a vertical path indicated by a line 86 since it runs along vertical support 12 (FIGS. 3 and 4).

Figure 11:
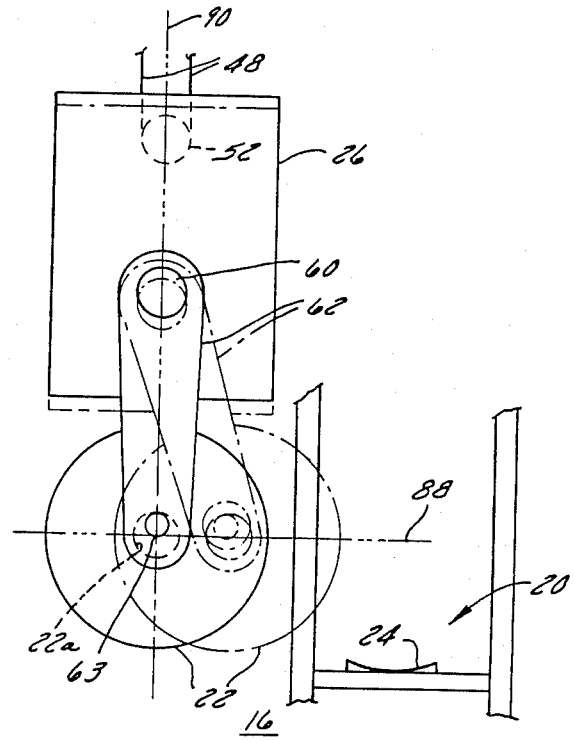

In the travel position the arms 62 are oriented generally vertically so that the load 22 can be moved along the aisle 16 for eventual delivery. The minimum width of the aisle 16 is thus limited only by the width of the load 22 itself, not by any part of the crane 10. In the load-up travel position as shown in FIG. 10, the load 22 is held above the carriage 26, and the arms 62 thus reach upward from the carriage 26. The load-up travel position will generally only be used to store loads 22 in the uppermost one or possibly the uppermost two storage stations 20 of the rack 18. The more common travel position is shown in FIG. 11 in solid lines, where the load 22 is carried beneath the carriage 26. This load-down travel position is generally more secure and stable than the load-up travel position, or at least it is less difficult and less expensive to make it more secure and stable. The load 22 is stored in a storage station 20 from the load-up travel position by reversal of the removal steps set forth above. The crane 10 is capable of switching the arms 62 from the load-up position to the load-down position and vice-versa by rotating them into any storage station 20 or, if loaded, any empty storage station 20 while moving the carriage 26 vertically, and continuing the rotation and vertical movement until the opposite position is reached.

Figure 13:
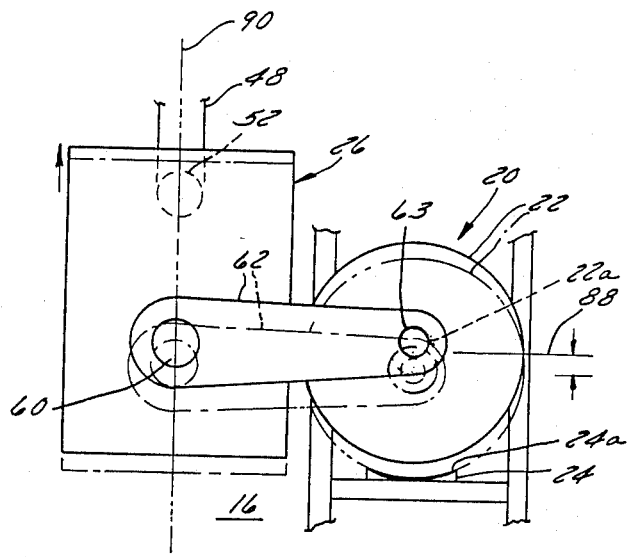
Figure 12:
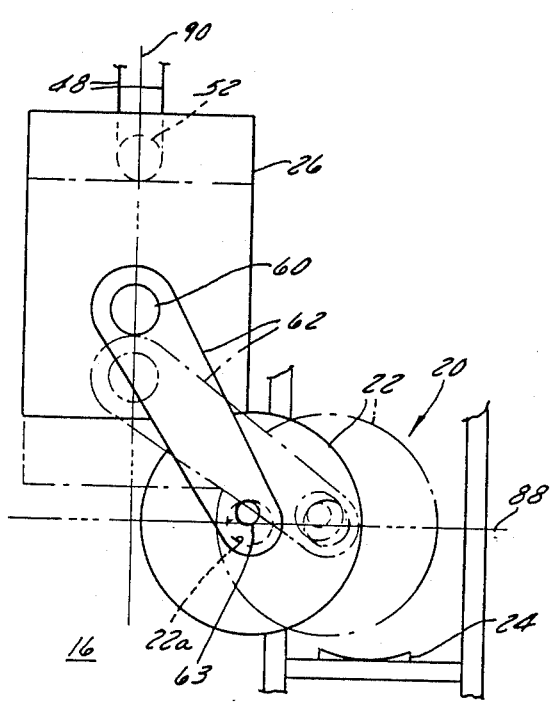

FIGS. 11, 12 and 13 show the crane 10 storing a load 22 in a storage station 20 from the load-down position. As referred to above, this will be the most commonly used travel position. In FIG. 11 the load-down travel position, with the arms 62 extending vertically downward from the carriage 26, is shown in solid lines. When the crane 10 has aligned the load 22 with the target storage station 20, arms 62 begin rotating clockwise toward the storage station 20 simultaneously with the carriage 26 beginning to be lowered, as shown there in phantom. This vertical motion of the carriage 26 and simultaneous rotating motion of arms 62 continues in a coordinated manner through the position shown in solid lines in FIG. 12 and through the position shown in phantom in FIG. 12, until the arms 62 are fully horizontal as shown in solid lines in FIG. 13, with the load 22 held just slightly above the saddle means 24. There the arms 62 are held without rotation while the carriage 26 is lowered until the load 22 rests on the saddle means 24 as shown in phantom in FIG. 13. As can be seen from comparing FIGS. 11, 12 and 13, once again the movement of the load has been coordinated so that, during the rotation of the arms 62, the load 22 moved only horizontally, along a straight line 88, while again of course the carriage 26 has moved only vertically along track 12 as indicated by a generally vertical line 90.

Figure 14:
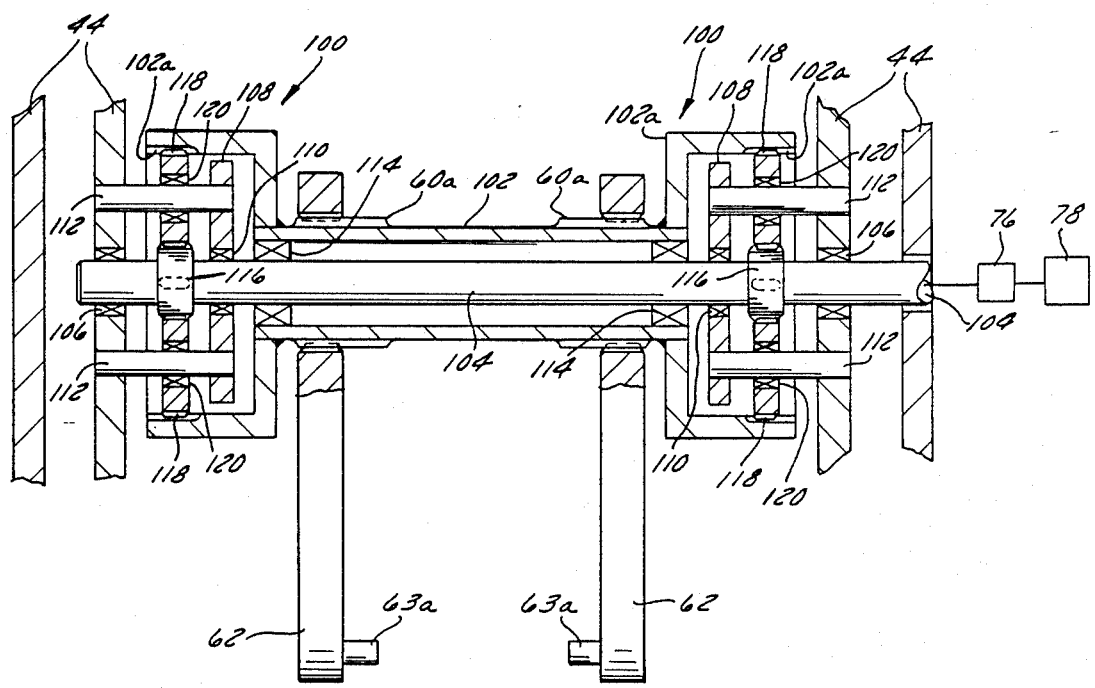
FIGS. 14 and 15 are sectional views, partially schematic, showing alternative embodiments of the drive means for rotating the arms.

Another embodiment of the invention includes a different rotating means 65a for rotating the arms 62 as shown in FIG. 14. The purpose of rotating means 65a is to more evenly distribute the torque load sustained by the apparatus on rotation of the arms 62 when loaded. To this end, rotating means 65a includes a planetary gear arrangement 100 at each end of a hollow shaft 102 to which the arms 62 are axially slidably but non-rotatably mounted. Similar to the embodiment previously described, the rotating means 65a in the present embodiment is driven by a rotator motor 78 via a speed reducing means 76, shown schematically in FIG. 14. In this embodiment the speed reducing means 76 drives a drive shaft 104 which is journaled at each end through carriage side plates 44 by means of bearings 106, and through a pair of support plates 108 by means of bearings 110. Support plates 110 are secured to carriage side plates 44, parallel thereto, by a plurality of perpendicular posts 112. These posts 112 in effect form the cage of the planetary gear system. The drive shaft 104 is journaled inside the hollow shaft 102 by means of bearings 114. Near each end of the drive shaft 104, between each carriage side plate 44 and support plate 108, a sun gear 116 is keyed to the drive shaft 104. A plurality of planetary gears 118 are journaled, one to each of the posts 112 in a position aligned with and meshing with the sun gears 116, by means of a bearing 120. Finally, each end of the hollow shaft 102 is enlarged to cover the support plates 108, each end terminating in a toothed annulus 102a which is aligned with and meshes with the planetary gears 118. Hence counterclockwise rotation of the drive shaft 104 produces clockwise rotation of the hollow shaft 102, and vice versa. This arrangement could be termed a 'four-bearing' arrangement because of the four bearings 106, 110, 114 and 120 used therein.

Figure 15:
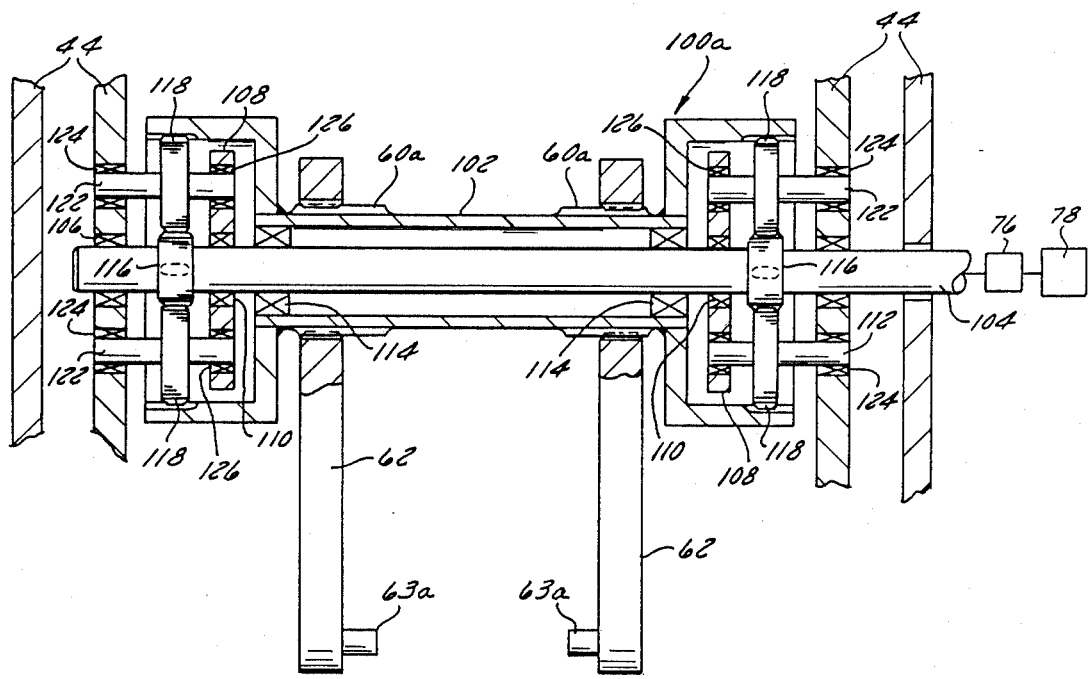

The arrangement shown in FIG. 15 differs from that in FIG. 14 only in certain details. Similar to the latter, in the embodiment shown in FIG. 15 drive shaft 104 drives hollow shaft 102 by means of a planetary gear arrangement 100a so that the torque of rotating the arms 62 is evenly distributed. Planetary gear arrangement 100a is similar to the planetary gear arrangement 100 shown in FIG. 14 in most respects. The only difference is in the arrangement of the planetary gears 118. In the embodiment shown in FIG. 15, each planetary gear 118 is keyed to a shaft 122. These shafts 122 replace the posts 112 described in reference to FIG. 14. Each such shaft 122 is journaled to one of the carriage side plates 44 at one end by a bearing 124 and journaled to support plate 108 at its opposite end by a bearing 126. Hence counterclockwise rotation of the drive shaft 104 again produces clockwise rotation of the hollow shaft 102, and vice versa. This arrangement could be termed a "five-bearing" arrangement because of the five bearings 106, 110, 114, 124 and 126 used therein. It has more parts than the four-bearing arrangement described above but it provides greater stability to the planetary gears 118.

Hence this invention provides a warehouse stacker crane capable of efficiently using the vertical dimension of a warehouse or other storage building by allowing a relative reduction of the shuttle window relative to shuttle table type stacker cranes. In addition, a crane embodying this invention allows access to the bottommost as well as the topmost storage stations of any particular storage rack without requiring the bottommost station to be located unduly high off the floor of the warehouse.

While the apparatus hereinbefore described is effectively adapted to fulfill the aforesaid objects, it is to be understood that the invention is not intended to be limited to the particular preferred embodiments of warehouse stacking crane herein set forth. Rather, it is to be taken as including all reasonable equivalents without departing from the scope of the appended claims.

We claim:

1. In combination with a storage rack positioned along an aisle extending in a predetermined direction and having a plurality of storage stations located therein and extending along said aisle, a stacker crane for insertion of a load in one of said storage stations and removal of a load from one of said storage stations, said stacker crane comprising:

carriage means having means for moving horizontally along said aisle and means for moving vertically so as to be aligned opposite said storage station;

load grasping means rotatably attached to said carriage means for grasping said load, including a pair of arms rotatable in parallel vertical planes and movable toward and away from each other;

means for operating said load grasping means so as to effect engagement and disengagement of said grasping means with said load, including means for synchronously rotating said arms in parallel vertical planes and means for moving said arms toward and away from each other; and control means for controlling said means for moving said carriage means vertically and said operating means, so as to effect vertical movement of said carriage away from alignment with said storage station and to effect coordinated simultaneous rotating movement of said load grasping means while said load grasping means is engaged with said load so that said load is moved only horizontally relative to said storage station during insertion and removal.

2. A stacker crane as recited in claim 1 further comprising a wheeled truck having means for moving horizontally along said aisle, said truck having vertically oriented members attached thereto along which said carriage is moved vertically by said vertical movement means.

3. A stacker crane as recited in claim 2 further comprising sheave means attached to said vertically oriented members, and
wherein said means for vertically moving said carriage means includes winch means attached to and supported by said wheeled truck, and cable means connected between said winch means and said carriage means and reeved about said sheave means therebetween for moving said carriage means vertically along said vertically oriented members.

4. A stacker crane as recited in claim 1 or claim 3 wherein said load grasping means includes:
shaft means journaled to said carriage means, the axis of which runs parallel to said aisle;
prime mover means connected to said shaft means for selectively rotating said shaft means, and attached to and supported by said carriage means;
said arms being non-rotatably attached to said shaft means so as to rotate with said shaft means when it rotates.

5. A stacker crane as recited in claim 4 wherein said arms project parallel outwardly from said shaft means and are slidable axially along said shaft means, said arms being slid along said shaft means by power cylinder means so as to slide together and apart to engage with and disengage from said load.

6. A stacker crane as recited in claim 5 wherein said load includes load engaging means, and
wherein each of said opposing arms includes, at the distal end thereof, means for gripping said load by engaging with said load engaging means of said load.

7. A warehouse stacker crane as recited in claim 6 wherein said load engaging means includes apertures, one at each side of said load, and wherein said gripping means includes projections for fitting into said apertures of said load engaging means.

8. A warehouse stacker crane as recited in claim 7 wherein said projections are affixed to the ends of said arms.

9. A warehouse stacker crane as recited in claim 4 wherein said shaft means includes a shaft journaled within said carriage means, and wherein said prime mover means includes an electric motor, a pinion gear driven by said electric motor, and a drive gear non-rotatably attached to said shaft and driven by said pinion gear.

10. A warehouse stacker crane as recited in claim 4 wherein said shaft means includes a shaft journaled within said carriage means, and wherein said prime mover means includes an electric motor and a four-bearing planetary gear arrangement by means of which said motor drives said shaft.

11. A warehouse stacker crane as recited in claim 4 wherein said shaft means includes a shaft journaled within said carriage means, and wherein said prime mover means includes an electric motor and a five-bearing planetary gear arrangement by means of which said motor drives said shaft.

12. A method of inserting and removing a load from a storage station which is part of a storage rack, said method comprising:
horizontally and vertically aligning a carriage means with said storage station;
rotating a load grasping means rotatably attached to said carriage means to be engagable with said load, which load grasping means includes a pair of arms slidably mounted on a shaft means, said shaft means being journaled to said carriage means, and which load grasping means is closed and opened by power cylinder means which cause said arms to slide together and apart along said shaft means engaging and disengaging said load;
closing said load grasping means to engage with said load; and
moving said carriage means vertically away from alignment with said storage station simultaneously with rotating said grasping means so as to remove said load from said storage station by coordinated motion of said carriage and said grasping means in such a way that the movement of said load is essentially horizontal.

13. A method as recited in claim 12 wherein said arms are also rotatable in parallel vertical planes.

14. In combination with a storage rack positioned along an aisle extending in a predetermined direction and having a plurality of storage stations located therein and extending along said aisle, a stacker crane for insertion of a load in one of said storage stations and removal of a load from one of said storage stations, said stacker crane comprising:
A. carriage means having means for moving horizontally along said aisle and means for moving vertically so as to be aligned opposite said storage station;
B. load grasping means rotatably attached to said carriage means for grasping said load, including
(1) shaft means journaled to said carriage means, the axis of which runs generally parallel to said aisle,
(2) a pair of arms non-rotatably attached to said shaft means so as to rotate with said shaft means when it rotates, projecting parallel outwardly from said shaft means and slidable axially along said shaft means, and
(3) prime mover means connected to said shaft means for selectively rotating said shaft means, and attached to and supported by said carriage means so as to move therewith;
C. means for operating said load grasping means so as to effect engagement and disengagement of said grasping means with said load, including
(1) means for synchronously rotating said arms in parallel vertical planes, and
(2) power cylinder means connected between said arms for sliding said arms together and apart along said shaft to engage with and disengage from said load; and
D. control means for controlling said means for moving said carriage means vertically and said load grasping operating means, so as to effect vertical movement of said carriage away from alignement with said storage station and to effect coordinated simultaneous rotating movement of said load grasping means while said load grasping means is engaged with said load so that said load is moved only horizontally, generally perpendicular to said aisle, relative to said storage station during insertion and removal.

15. A stacker crane as recited in claim 14 wherein said load includes load engaging means, and wherein each of said opposing arms includes at the distal end thereof, means for gripping said load by engaging with said load engaging means of said load.

16. A warehouse stacker crane as recited in claim 15 wherein said load engaging means includes apertures, one at each side of said load, and wherein said gripping means includes projections for fitting into said apertures of said load engaging means.

17. A warehouse stacker crane as recited in claim 16 wherein said projections are affixed to the ends of said arms.

* * * * *